W. J. BELYEA.
TIRE ARMOR.
APPLICATION FILED SEPT. 15, 1906.
927,447.
Patented July 6, 1909.
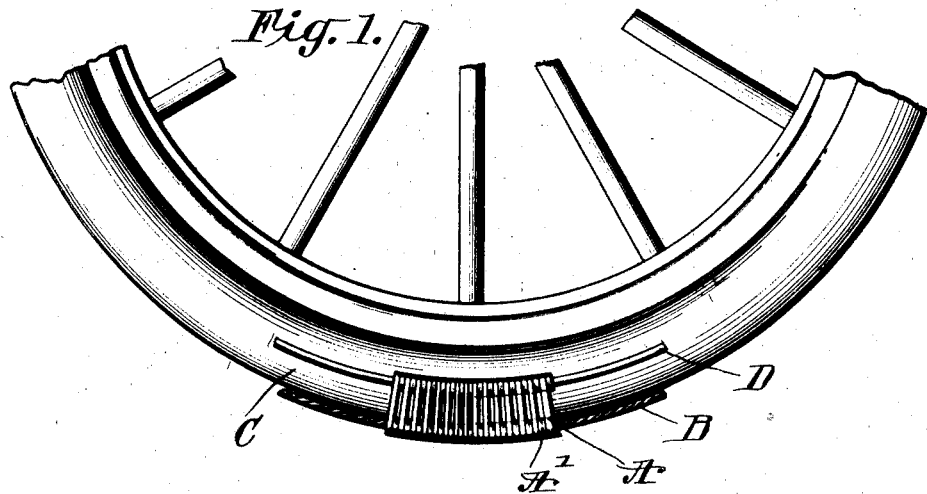
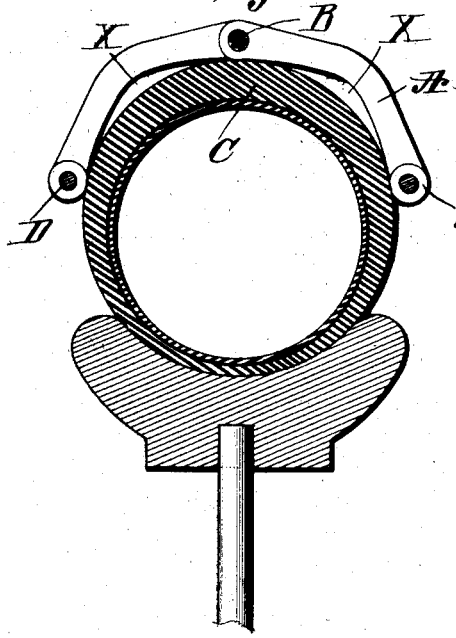
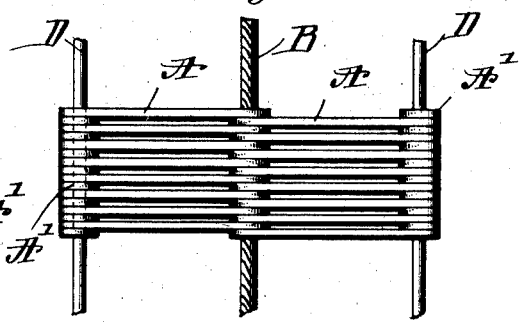
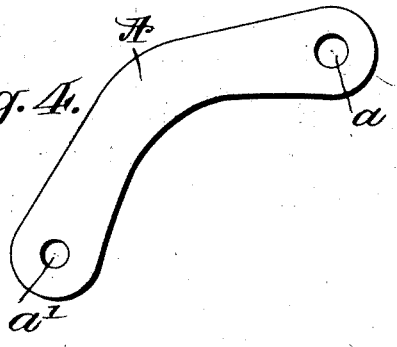
WITNESSES
INVENTOR
WELLINGTON J. BELYEA
BY Munn & Co.
ATTORNEYS

UNITED STATES PATENT OFFICE.

WELLINGTON J. BELYEA, OF PORT HURON, MICHIGAN.

TIRE-ARMOR.

No. 927,447.  Specification of Letters Patent.  Patented July 6, 1909.

Application filed September 15, 1906. Serial No. 334,718.

*To all whom it may concern:*

Be it known that I, WELLINGTON J. BELYEA, a citizen of the United States, and a resident of Port Huron, in the county of St. Clair and State of Michigan, have invented certain new and useful Improvements in Tire-Armor, of which the following is a specification.

My invention relates particularly to improvements in a guard armor or protector for rubber tires of automobiles, although it may be used on rubber tires of other vehicles, the object being to provide an armor that may be readily placed over a tire and absolutely protect the same from wear or abrasion, and also enable the use of a brake directly to the tread of the wheel.

With these and other objects in view my invention consists of a series of segments laced on sustaining cables or wires embracing the rubber tire.

My invention consists further in certain novel features of construction, arrangement and combination of parts as will be hereinafter fully described and pointed out in the claims, reference being had to the accompanying drawing, in which, Figure 1 is a partial side elevation of an automobile wheel with my improvements applied. Fig. 2 is a transverse section of a rim and tire with the armor applied. Fig. 3 is a plan view of a section of my armor. Fig. 4 is a side elevation of one of the segments.

In carrying out my invention I use a sufficient number of thin segments of metal or other suitable material and of substantially the shape shown in Fig. 4; each segment is provided with holes $a$, $a'$ near each end; the segments are placed as shown in Fig. 3, the inner ends overlapping so that the holes $a$ register, and through these holes is passed a steel cable or hoop B; the said inner ends of the segments resting on the tread of the tire C; the outer ends of the segments rest on the sides of the tire and through the openings $a'$ are passed the flexible rods or hoops D; as the inner ends of the segments overlap there will naturally be a space between each two segments at the outer end or where the rods D pass through them; this space I fill by placing washers A′ between the adjacent segments and mounted on the rods D. It will be noticed that the diameter of the rings formed by the rods D is of less diameter than the central cable B which sustains the inner overlapping ends of the segments so that a cover or guard having its inner face substantially convex and fitting the tire is formed.

It will be noticed that none of the segments can move without taking the others with it, and that each of the segments at the bottom of the tire, or the part resting on the ground will be held in place by the cable or hoop B which passes entirely around the tire. When the portion of the tire bearing on the sections on the ground is flattened out, so as to fill the spaces marked $x$ $x$, there can be no further expansion in that direction and the tire will then expand at the exposed part between rods D and the wooden rim.

From the above it will be seen that I provide an armor that will prolong the life of a rubber tire, first by preventing punctures and secondly by preventing wear on the tread of the tire, and that it will retain all the elasticity of the tire, and that it will give a much firmer grip on the ground than the ordinary rubber tire so as to prevent slipping; furthermore the armor will permit the use of a brake directly on the surface of the tire, which is believed to be of considerable advantage over the ordinary axle brakes now used.

While I prefer to use thin steel segments on account of their lightness and strength, yet it is obvious that other materials which may be found suitable may be used. I also prefer to use a flexible steel cable or cord for the central hoop B, and the outer hoops are preferably of flexible steel wire or rings; the whole when properly assembled forms a complete sheath, which will be held to the tire by the inflation of the same; that is, the sheath is placed on the wheel while the tire is deflated; the tire is then inflated, whereupon the sheath will be held firmly in place.

I claim—

1. An armor for elastic tires consisting of an endless sheath comprising relatively thin bent plates arranged transversely of the tread of the tire and having their inner ends overlapping and pivotally joined together, the inner edges of the overlapping ends being struck on arcs of the same radius whereby said inner edges are coextensive and the central portions of said plates curved outwardly, whereby a space is left between the centers of the plates and the inclosed tire, and endless hoops passing through the outer ends of the plates.

2. An armor for elastic tires consisting of a sheath comprising relatively thin transversely disposed metal plates, placed side by side and resting on one edge on the tire, the outer edge of the plates being curved and the inner ends overlapping, an endless flexible hoop passing through the overlapped ends, the inner edges of the overlapped ends of the plates which rest on the tread of the tire being on arcs of the same radius whereby said inner edges will be coextensive, flexible hoops passing through the free outer ends of the metal plates and spacing washers fitted on said flexible hoops on each side of each plate.

WELLINGTON J. BELYEA.

Witnesses:
  HERMAN L. STEVENS,
  HERMAN W. STEVENS.